2,940,857

PRESERVATION OF SILAGE

Fred N. Andrews, West Lafayette, Ind., assignor to Purdue Research Foundation, Lafayette, Ind., a corporation of Indiana No Drawing. Filed Dec. 19, 1958, Ser. No. 781,475

6 Claims. (Cl. 99—8)

My invention relates to a method for the preservation of silage. More particularly, it relates to a method of preserving silage with zinc bacitracin.

One of the important problems with which the farmer is continually faced is the storage and preservation of green forage. The reason for this is at least two-fold. Frequently, it is necessary to harvest forage in the green, or uncured, form if any utility therefrom is to be recovered. Sometimes, the thus harvested forage is permitted to dry in the field and then baled and stored. Unfortunately, however, some of the useful ingredients of the forage are thereby destroyed and, at the same time, the final dried product is generally not as palatable to the animals. These drawbacks have been overcome to some extent by the storage of the freshly cut material as silage. In practice, the freshly cut material, which may be corn, alfalfa or other legumes, grasses, hay, various cereal grains, and the like, is generally cut to sizes averaging one-half to one inch long and then packed into storage containers designated as silos. The latter should preferably be constructed so as to exclude air and moisture. Sometimes the silage is moistened with water as it is packed into the silo, but some materials contain an adequate amount of moisture and no addition is required.

The green, wet silage in the silos provides an almost ideal medium for fermentation by the various forms of microorganisms present thereon when packed. Certain types of fermentations which can take place therein form products which do not detract from the utility and palatability of the silage. Other fermentations which can take place, however, are deleterious in character and destroy many of the useful ingredients of the forage, such as vitamins, enzymes, proteins, etc. and also reduce palatability. The preservation of silage therefore involves the difficult problem of suppressing or completely inhibiting the latter types of fermentation and encouraging or facilitating the types of fermentations which actually add to the nutritive properties and palatability of the silage. The harmful, or putrefactive bacteria, yeast and the like, are unable to grow in the presence of the relatively large amounts of organic acids, mainly lactic and acetic, produced by the favorable type fermentations. This is another reason for assisting prompt and vigorous fermentation in the silage by microorganisms which produce lactic and acetic acids.

The desirable fermentation in silage has in the past been facilitated by the addition to the silage of such materials as molasses or corn, which afford readily available nutrient carbohydrates for the lactic and acetic-producing microorganisms and thus facilitate their growth. A second method which has been extensively used in the past is to incorporate in the silage as it is being packed chemicals which inhibit the growth of the undesirable microorganisms, such as the putrefactive bacteria and the yeasts, and which do not materially affect the rate of fermentative activity of the lactic and acetic acid-producing microorganisms. Materials of this type which have been recommended in the past, include organic acids such as formic, acetic, lactic and phosphoric acids; calcium formate, sodium bisulphite, sodium pyrosulphate, etc. The use of these various agents, however, has been not entirely satisfactory for various reasons, including such factors as reduced palatability, cost, difficulty of use, the formation of undesirable odors, and other factors which result in lowered consumption and utilization of the silage.

I have now discovered that silage can be effectively preserved in an economical manner without the disadvantages resulting from the various types of chemical preservatives previously used in the past, by incorporating in the silage as it is packed suitable quantities of zinc bacitracin which inhibits or prevents the undesirable types of fermentation in the silage and, at the same time, does not materially affect the desirable forms of fermentation therein. The zinc bacitracin being a relatively stable form of antibiotic serves to maintain this desirable condition in the silage throughout the critical storage period. The silage thus preserved has the added advantage over silages treated with previously recommended preservatives in that the treated silage is highly palatable to animals to which it is fed, and, at the same time, retains in substantially undiminished quantities the various useful ingredients of the silage.

I have now found that excellent grades of silages of various types are obtained by incorporating zinc bacitracin in amounts ranging from 1 to 50 grams per ton of silage at the time the silage is packed into the silo. This can be accomplished either by blowing regulated amounts of powdered zinc bacitracin into a moving stream of the silage as it passes into the silo, or by spraying aqueous solutions or suspensions of the zinc bacitracin onto the silage as it passes into the silo, the zinc bacitracin being added in each case in a manner so as to thoroughly mix the zinc bacitracin with the silage. If desired, the zinc bacitracin can be used in combination with the nutritive preservatives of the character previously used, such as molasses, corn or other suitable form of carbohydrate. When used, the latter can be employed in any desired amounts, but preferably not in excess of the amounts which have customarily been employed in the past. Preferably, somewhat smaller than the latter quantities should be employed since the ability of the zinc bacitracin to inhibit or prevent the undesired types of fermentations is such that it is not necessary to obtain the rapid degree of desired lactic and acetic fermentation as in the past since the rapid formation of relatively high concentrations of lactic and acetic acids are no longer required to inhibit the undesired forms of fermentation.

I have found that silage preserved with zinc bacitracin alone or in combination with the commonly used nutritive preservatives are equally, and in some instances more, palatable than those preserved with the aid of only the nutritive preservatives and are decidedly superior to those preserved with the chemical preservatives such as sodium bisulphate.

The following specific examples will serve to illustrate my invention but it should be understood, however, that I am not limited either to the specific procedures set forth or to the specific methods of incorporation of the zinc bacitracin or the amounts or specific preservatives employed therein, or to the specific silage shown therein, my new process being applicable generally to the preservation of silage of various types, including corn, alfalfa or other legumes, grasses, hay, various cereal grains, and the like.

EXAMPLE I

Second cutting alfalfa in full bloom was harvested and chopped into one-half to one inch length particle sizes. Two pound samples of material were placed in plastic bags as described by Walker et al. (J. Animal Science, 13, 1013). One group of samples contained no zinc bacitracin, one group contained zinc bacitracin and ground corn at an equivalent rate of 200 pounds per ton of silage and a third group contained zinc bacitracin and an equivalent of 80 pounds of molasses per ton. pH determinations were made at the end of 14 and 42 days' storage. The following table shows the pH's at the end of these storage periods:

*Table I*

| Treatment | pH, 14 Days | pH, 42 Days |
|---|---|---|
| Bacitracin: | | |
| 0 | 5.6 | 5.3 |
| 4 gm./ton | 5.6 | 5.3 |
| 40 gm./ton | 5.8 | 5.4 |
| Ground Corn and Bacitracin: | | |
| 0 | 4.8 | 4.4 |
| 4 gm./ton | 4.6 | 4.4 |
| 40 gm./ton | 4.7 | 4.3 |
| Molasses and Bacitracin: | | |
| 0 | 4.1 | 4.1 |
| 4 gm./ton | 4.2 | 4.0 |
| 40 gm./ton | 4.6 | 4.4 |

EXAMPLE II

This experiment was run exactly as Example I with the exception that the forage was a mixture of Brome grass and alfalfa in the ¼ to ½ bloom stage. Molasses was added at levels of 40 and 80 pounds per ton of silage. pH determinations were similarly made at different intervals and are recorded in the following table:

*Table II*

| Treatment | pH, 1 Month | pH, 3 Months | pH, 6 Months |
|---|---|---|---|
| Bacitracin: | | | |
| 0 | 4.1 | 4.4 | 4.8 |
| 4 gm./ton | 4.0 | 4.1 | 4.9 |
| 20 gm./ton | 3.9 | 4.1 | 5.0 |
| 40 gm./ton | 4.6 | 4.0 | 4.8 |
| Bacitracin+40 Lbs. Molasses: | | | |
| 0 | 4.5 | 4.2 | 4.6 |
| 4 gm./ton | 3.7 | 4.6 | 4.6 |
| 20 gm./ton | 4.3 | 4.4 | 4.2 |
| 40 gm./ton | 4.5 | 4.3 | 3.8 |
| Bacitracin+80 Lbs. Molasses: | | | |
| 0 | 3.8 | 4.4 | 4.1 |
| 4 gm./ton | 4.0 | 4.3 | 4.0 |
| 20 gm./ton | 4.2 | 4.6 | 3.5 |
| 40 gm./ton | 3.6 | 4.2 | 3.8 |

Table III below shows the chemical analyses of the products at the end of the three months for the products shown in Table II.

*Table III*

| Treatment | Dry Matter, Percent | Protein, Percent | Ether Extract, Percent | Fiber, Percent | N Free Extract, Percent | Ash, Percent |
|---|---|---|---|---|---|---|
| Bacitracin: | | | | | | |
| 0 | 14.17 | 4.82 | 0.94 | 4.39 | 13.23 | 1.83 |
| 4 gm./ton | 13.15 | 4.71 | 1.22 | 4.48 | 11.93 | 1.57 |
| 20 gm./ton | 12.54 | 4.36 | 1.07 | 4.21 | 11.47 | 1.48 |
| 40 gm./ton | 13.28 | 4.87 | 0.87 | 4.43 | 12.41 | 1.78 |
| Bacitracin+40 lbs. Molasses: | | | | | | |
| 0 | 14.60 | 4.50 | 0.77 | 4.55 | 13.83 | 1.86 |
| 4 gm./ton | 15.30 | 4.69 | 1.26 | 4.52 | 14.04 | 1.84 |
| 20 gm./ton | 15.22 | 4.57 | 0.94 | 4.13 | 14.28 | 1.80 |
| 40 gm./ton | 15.80 | 4.79 | 0.97 | 4.99 | 14.83 | 1.93 |
| Bacitracin+80 lbs. molasses: | | | | | | |
| 0 | 13.99 | 4.48 | 0.92 | 4.63 | 13.07 | 1.83 |
| 4 gm./ton | 15.35 | 4.52 | 1.07 | 4.42 | 14.28 | 2.01 |
| 20 gm./ton | 17.75 | 4.59 | 1.01 | 4.40 | 16.74 | 1.83 |
| 40 gm./ton | 17.37 | 4.72 | 1.42 | 5.10 | 15.95 | 2.03 |

Feeding tests on the above samples have indicated that the product containing as a preservative only approximately 5 grams of bacitracin per ton of silage is the most palatable to feeding steers.

The experiments of Table I above show that satisfactory fermentation occurred in alfalfa silage to which zinc bacitracin had been added. When no added carbohydrate was provided, the pH was still high at the end of six weeks. The color of all samples was good. The odor of all samples with either corn or molasses was superior to those which had no added carbohydrate and there was no gross evidence of putrefaction in any sample. When corn or molasses were added highly satisfactory pH levels were reached within two to four weeks. Zinc bacitracin did not interfere with acid production at a level of 40 gm./ton. The data in Table III show that there are no important differences in protein, ether extract, fiber or ash between any of the treatments. It would be expected that the use of molasses would increase both dry matter and nitrogen-free extract and this appears to be the case. The presence of zinc bacitracin in silage not only does not prevent a highly satisfactory fermentation, but also preserves the nutrients present when molasses also is used.

The three months' storage silage samples shown in Table II were dried, extracted in ethanol and the extracts fed to ovariectomized mice for a three day period. All samples showed estrogenic activity at the end of the test when they were compared to a standard control diet. When the data were grouped on the basis of molasses or no molasses, there was a highly significant increase in estrogen activity in the molasses groups. The addition of zinc bacitracin at any level did not significantly affect estrogen activity in the absence of molasses.

Now having described my invention, what I claim is:

1. In a process for the preservation of silage, the step which comprises uniformly incorporating in silage prior to storage zinc bacitracin in amounts ranging from 1 to 50 grams/ton of silage.

2. In a process for the preservation of silage, the step which comprises uniformly incorporating in silage before storage approximately 5 grams of zinc bacitracin per ton of silage.

3. In a process for the preservation of silage, the step which comprises uniformly incorporating in silage before storage zinc bacitracin ranging in amount from 1 to 50 grams per ton of silage, and a nutrient carbohydrate in an amount sufficient to facilitate the lactic-acetic fermentation in said silage during storage.

4. In a process for the preservation of silage, the step which comprises uniformly incorporating in said silage before storage an amount of zinc bacitracin ranging from 1 to 50 grams per ton of silage, and an amount of a nutrient material selected from the group consisting of molasses and corn sufficient to facilitate the lactic-acetic fermentation in said stored silage.

5. In a process for the preservation of silage, the step which comprises uniformly incorporating in silage before storage an amount of zinc bacitracin ranging from 1 to 50 grams per ton of silage, and from 40 to 80 pounds of molasses per ton of silage.

6. In a process for the preservation of silage, the step which comprises uniformly incorporating in silage before storage, an amount of zinc bacitracin ranging from 1 to 50 grams per ton of silage, and approximately 200 pounds of ground corn per ton of silage.

References Cited in the file of this patent
UNITED STATES PATENTS

| 2,162,922 | Schmidt | June 20, 1939 |
| 2,733,146 | Holst | Jan. 31, 1956 |
| 2,786,768 | Deatherage | Mar. 26, 1957 |
| 2,809,892 | Chornock | Oct. 15, 1957 |